May 8, 1951  C. B. WELLER  2,551,985
TICKET FORMING AND MARKING MACHINE
Filed Sept. 20, 1946  10 Sheets-Sheet 2
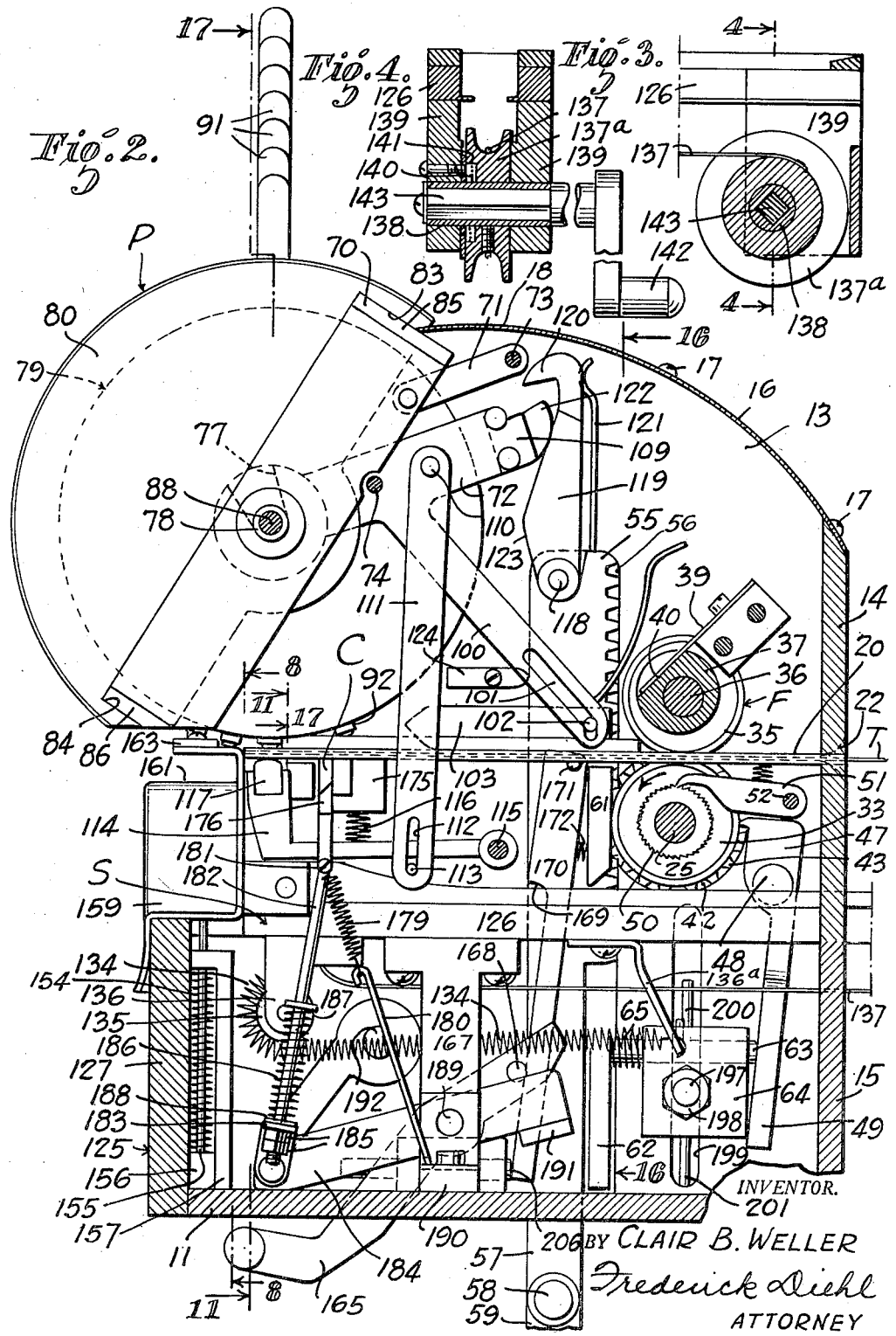
INVENTOR.
BY CLAIR B. WELLER
Frederick Diehl
ATTORNEY

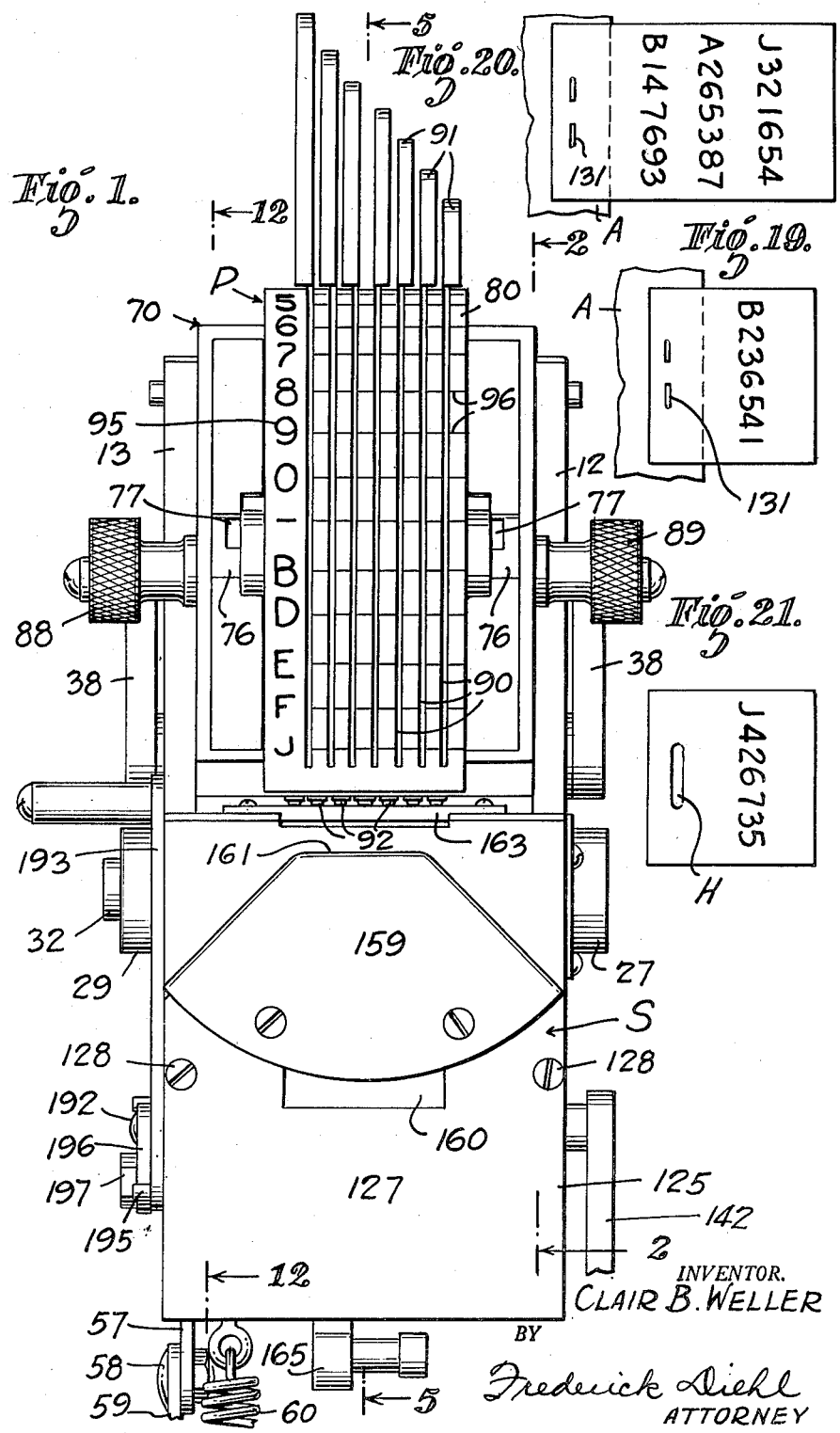

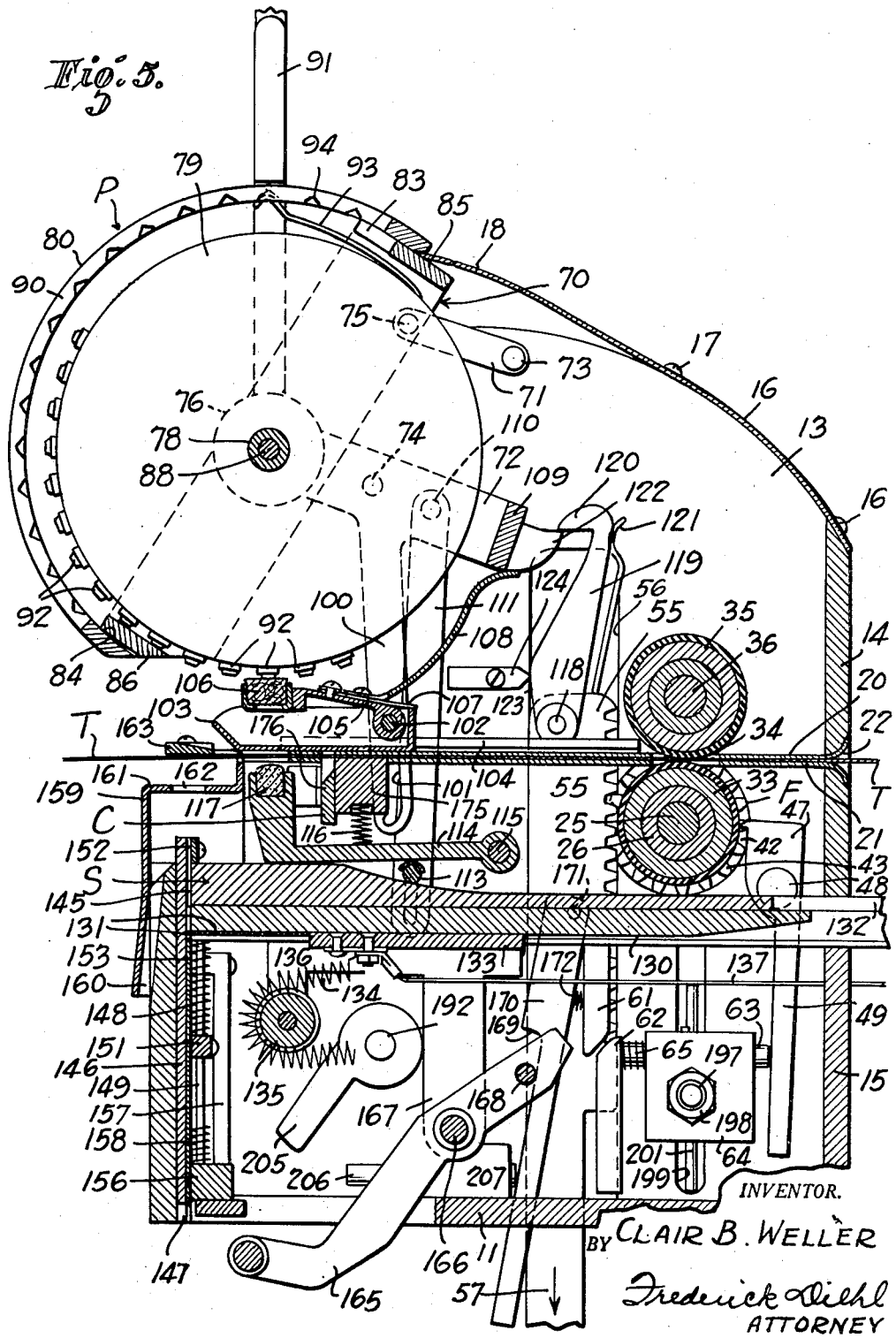

May 8, 1951  C. B. WELLER  2,551,985
TICKET FORMING AND MARKING MACHINE
Filed Sept. 20, 1946  10 Sheets-Sheet 4
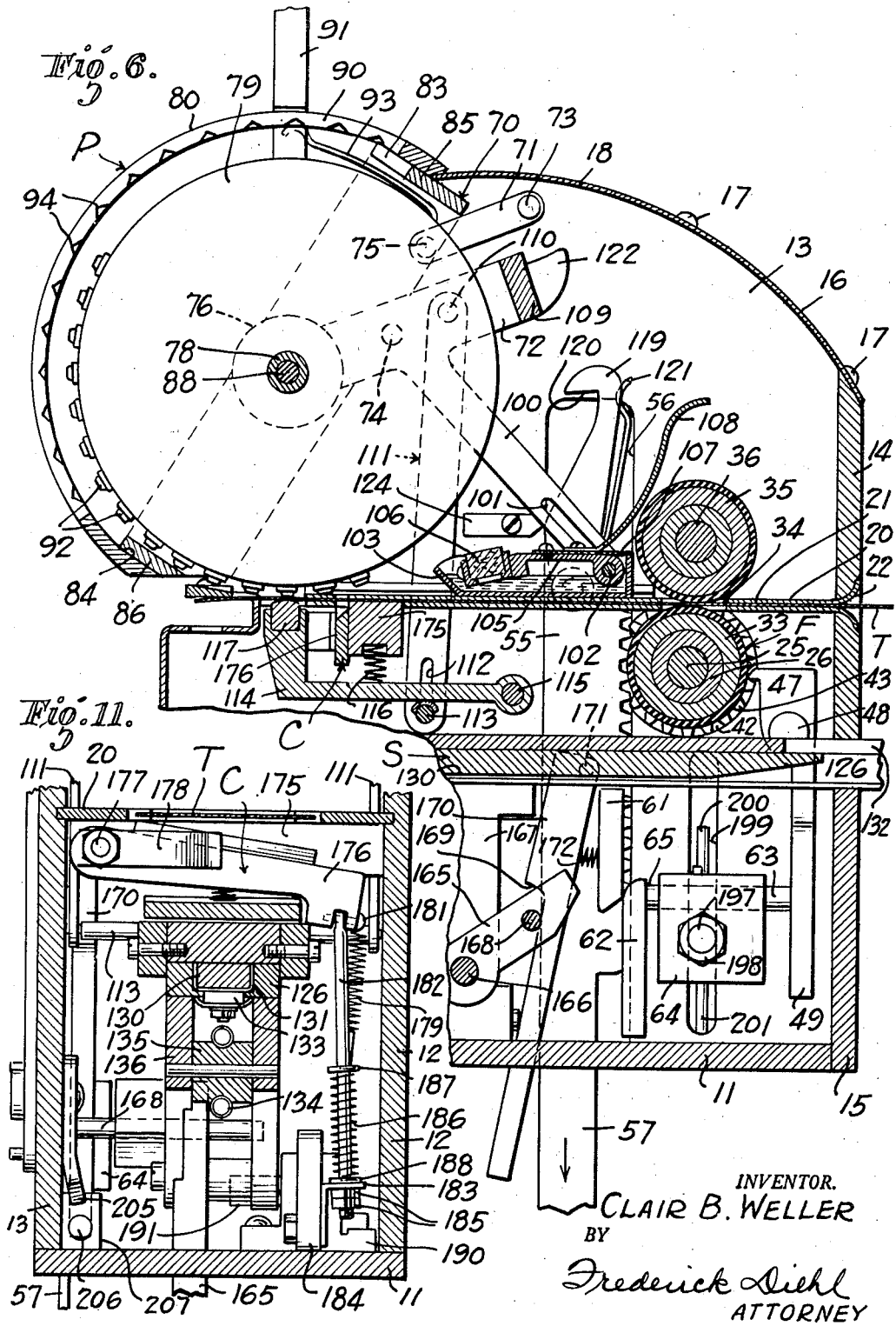
INVENTOR.
CLAIR B. WELLER
BY
Frederick Diehl
ATTORNEY

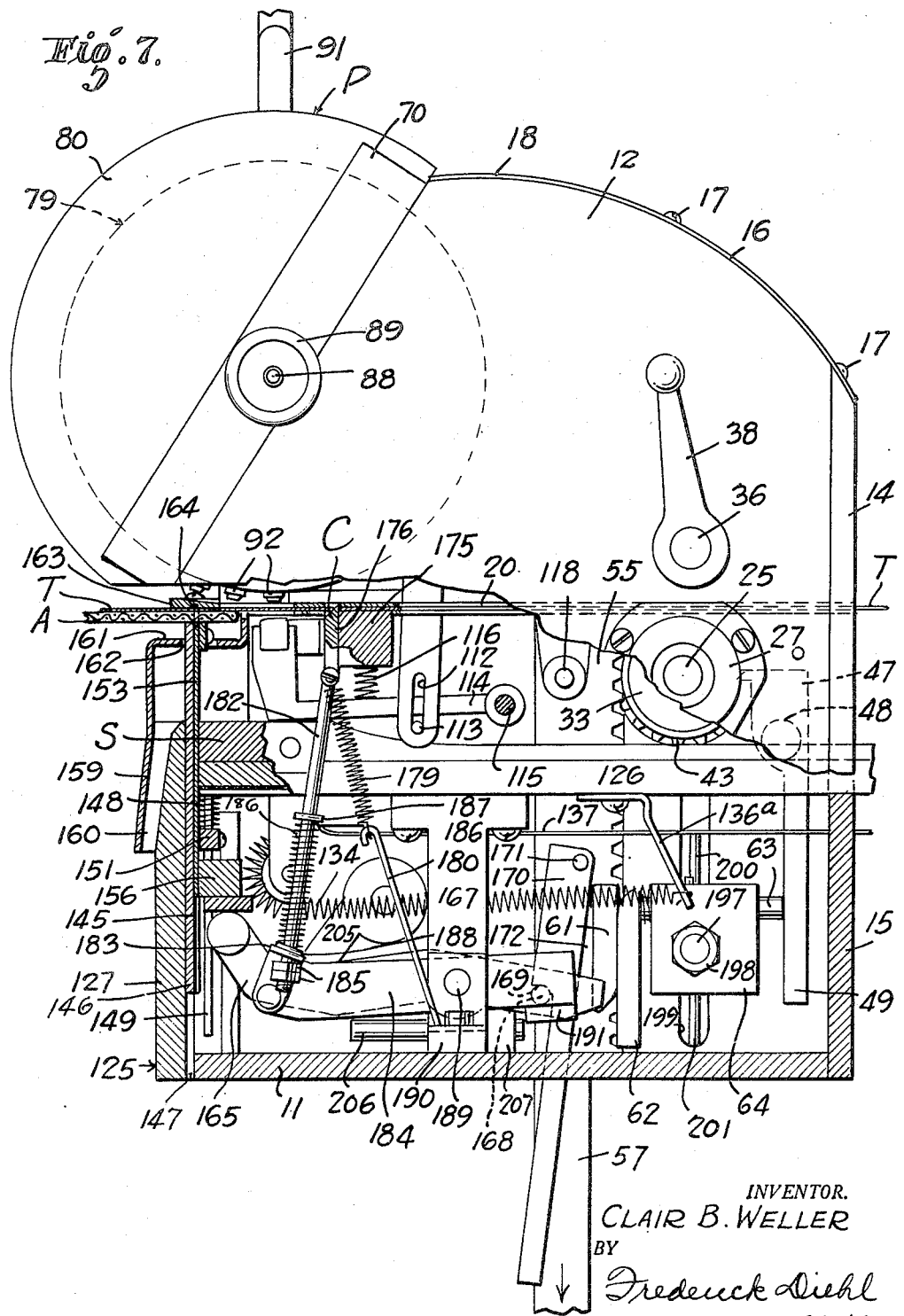

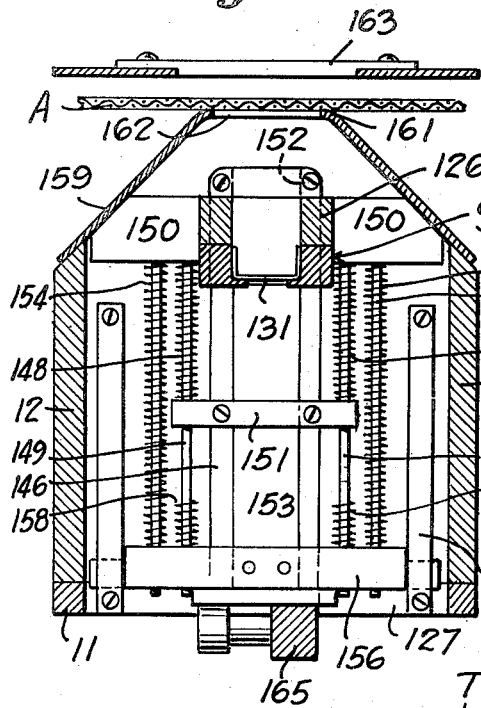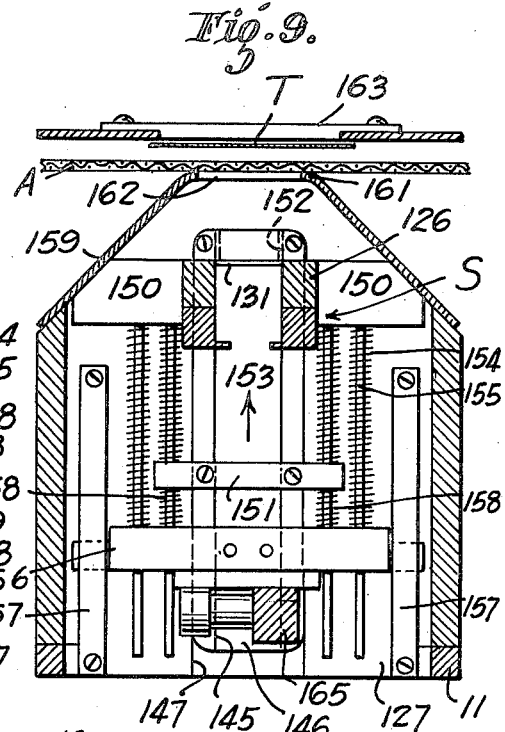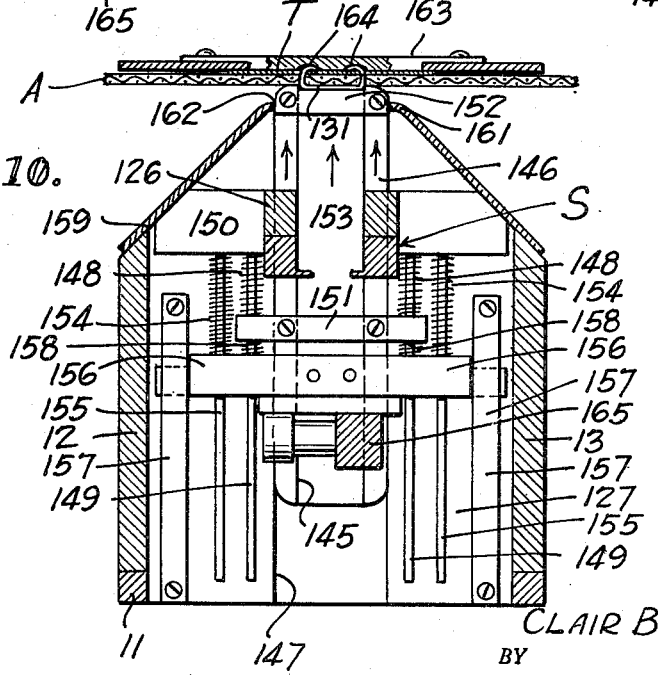

May 8, 1951  C. B. WELLER  2,551,985
TICKET FORMING AND MARKING MACHINE
Filed Sept. 20, 1946  10 Sheets-Sheet 7

INVENTOR.
CLAIR B. WELLER
BY
Frederick Diehl
ATTORNEY

May 8, 1951  C. B. WELLER  2,551,985
TICKET FORMING AND MARKING MACHINE
Filed Sept. 20, 1946  10 Sheets-Sheet 8

INVENTOR.
CLAIR B. WELLER
BY
Frederick Diehl
ATTORNEY

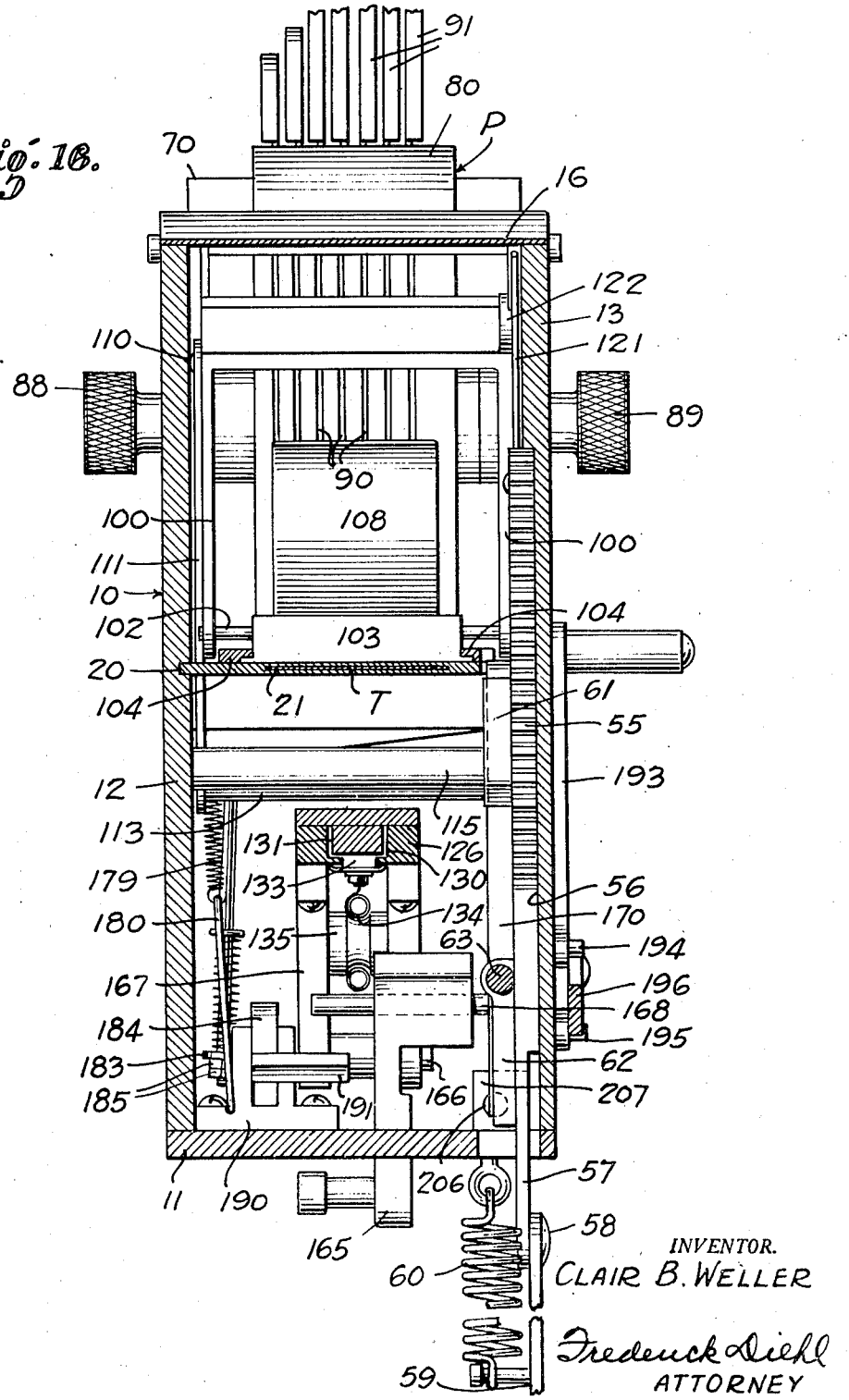

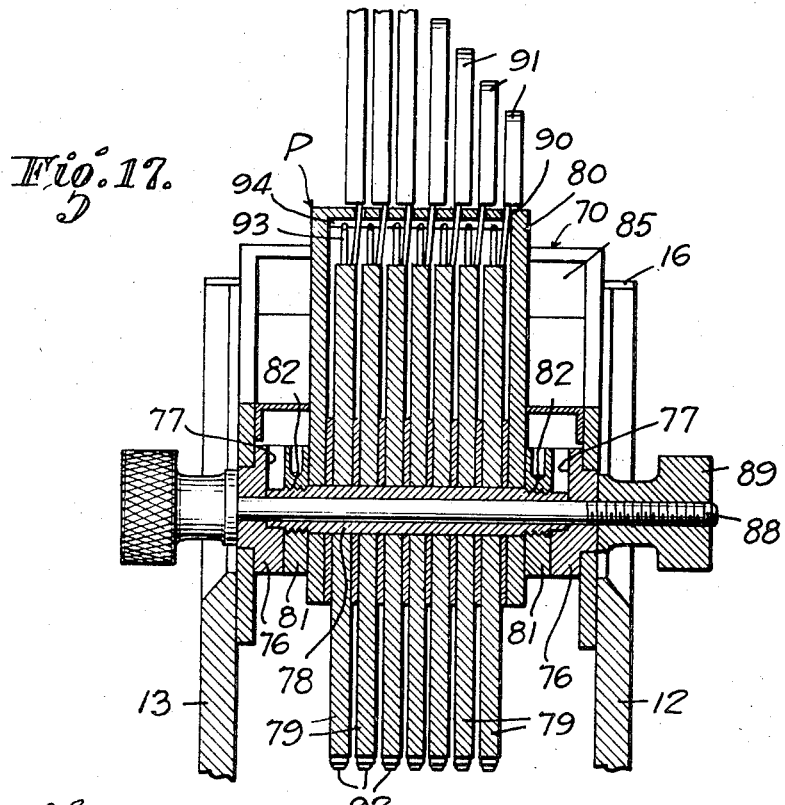
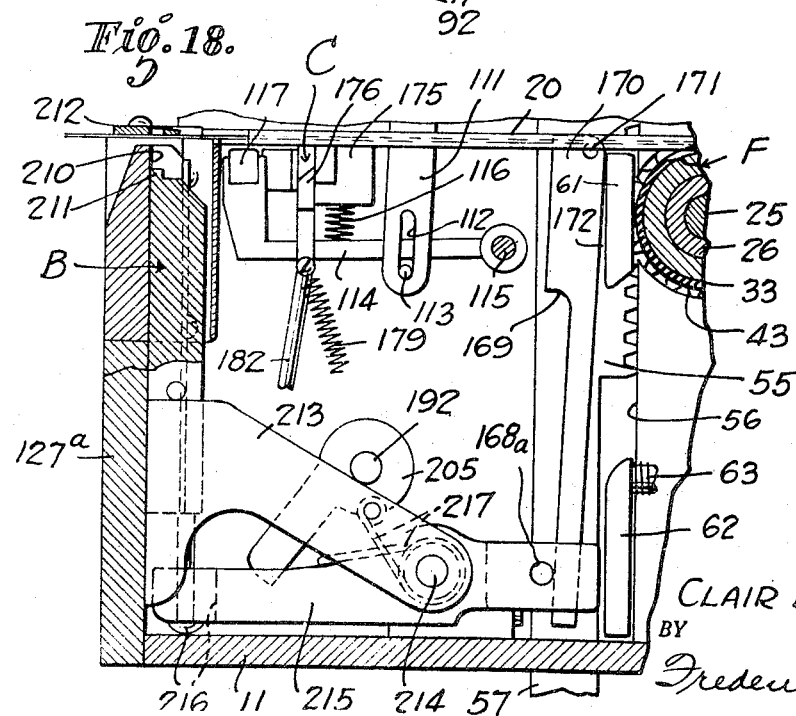

Patented May 8, 1951

2,551,985

UNITED STATES PATENT OFFICE 2,551,985

TICKET FORMING AND MARKING MACHINE

Clair B. Weller, Los Angeles, Calif.

Application September 20, 1946, Serial No. 698,251

6 Claims. (Cl. 101—93)

My invention relates generally to printing, stapling and perforating mechanisms, and more particularly to a machine adapted to operate upon ticket material from a supply roll by dividing the material into tickets which are marked and attached to garments or other articles for identification or other purpose.

An object of my invention is to provide a machine as above set forth, which, in response to a single actuation of an operating member, automatically and successively functions to feed a predetermined amount of ticket stock, ink type, print from the inked type upon the stock, cut off a ticket from the stock, and either staple the printed ticket to an article, or perforate the ticket with a buttonhole for subsequent attachment of the ticket to a button on the article.

Another object of my invention is to provide a machine of the above described character which enables any number of preselected marks to be printed in a column upon the ticket stock prior to cutting off a ticket from the stock and in a manner to feed only the added amount of stock necessary to contain the column of marks, so as to prevent waste of the stock.

A further object of my invention is to provide a stapling unit embodying a ram which separates a single staple from a clip, advances the staple therefrom while confining the staple in a presser member against tilting as the staple is delivered to the point of stapling to insure that the staple will be accurately driven to complete the stapling operation with an absolutely secure fastening of the ticket to the article.

A still further object of my invention is to provide a machine of the above described character including removably associated stapling and buttonhole perforating units which are selectively employed in accordance with the type of fastening desired, and are substituted one for the other in the machine with the utmost ease and dispatch.

With these and other objects in view, the invention resides in the combinations, arrangements and functional relationships of elements as set forth in the following specification and particularly pointed out in the appended claims.

In the accompanying drawings,

Figure 1 is a view showing in front elevation, one form of ticket forming, marking and attaching or perforating machine embodying my invention;

Figure 2 is a vertical sectional view taken on the line 2—2 of Figure 1 and illustrating the working parts of the machine in normal position;

Figure 3 is a fragmentary detail sectional view of a portion of the stapling unit;

Figure 4 is a vertical sectional view taken on the line 4—4 of Figure 3;

Figure 5 is a vertical sectional view of the machine embodying this invention and showing the stock feeding and type inking position of the machine;

Figure 6 is a view similar to Figure 5 and illustrating the printing position of the machine;

Figure 7 is a view similar to Figures 5 and 6 and illustrating the stapling and cutting off position of the machine;

Figure 8 is a vertical transverse sectional view taken of the line 8—8 of Figure 2, and illustrating the normal position of the stapling mechanism;

Figures 9 and 10 are views similar to Figure 8 and illustrating successive positions of the stapling mechanism to complete the stapling operation;

Figure 11 is a vertical transverse sectional view taken on the line 11—11 of Figure 2 and illustrating the cutting off mechanism;

Figure 16 is a vertical transverse sectional view taken on the line 16—16 of Figure 2;

Figure 17 is a vertical transverse sectional view of the printing mechanism taken on the line 17—17 of Figure 2;

Figure 18 is a fragmentary vertical sectional view illustrating the buttonhole perforating unit applied to the machine in place of the stapling unit;

Figure 19 is a plan view of a marked ticket stapled to an article.

Figure 20 is a plan view of a ticket with a column of identification marks printed thereon, with the ticket attached to an article; and Figure 21 is a plan view of a marked ticket perforated with a buttonhole.

Figure 12:
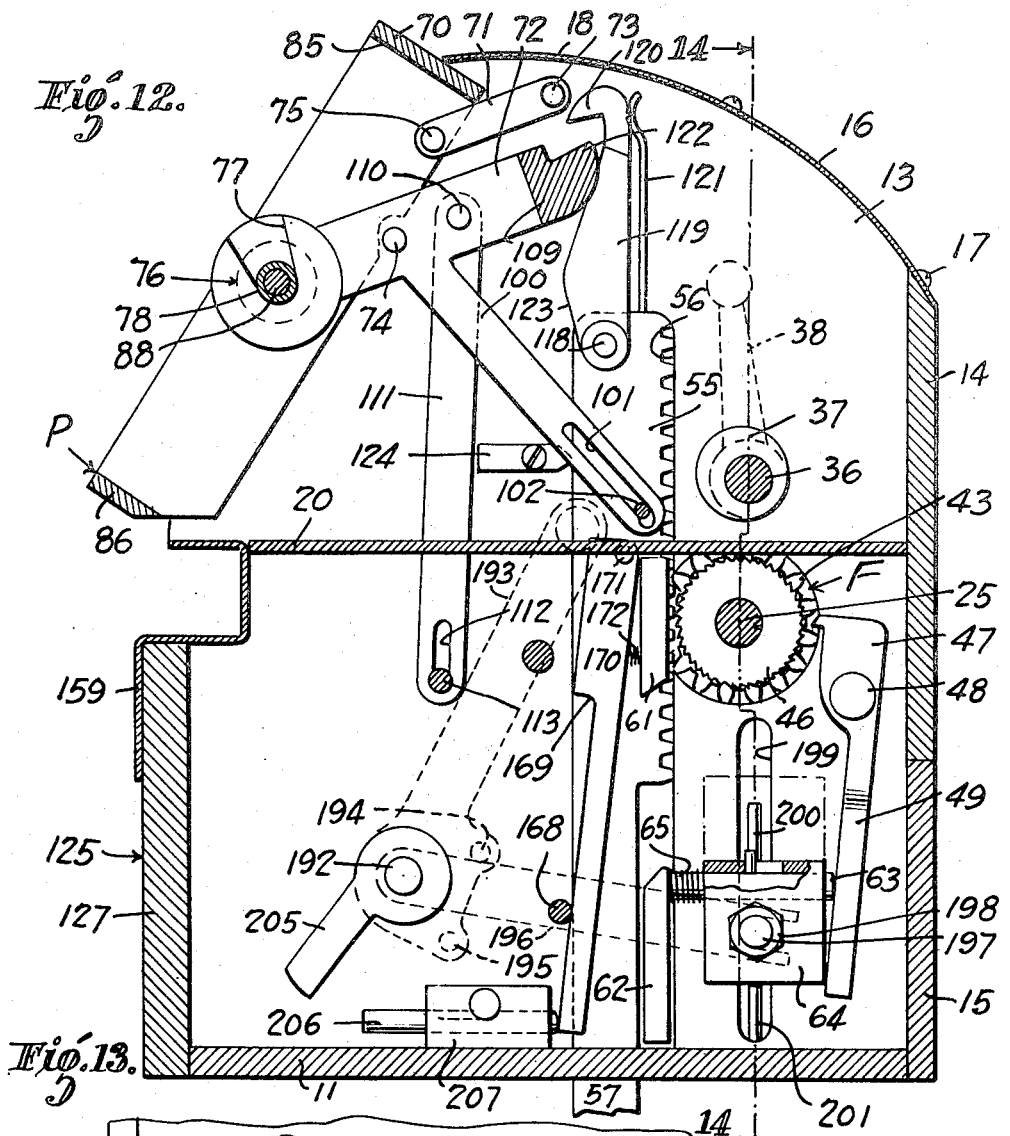
Figure 12 is a vertical sectional view taken of the line 12—12 of Figure 1.

Referring specifically to the drawings, my invention is, in its broad aspect, composed of a stock feeding mechanism F, a printing mechanism P, a stapling unit S, a buttonhole-forming unit B, and stock-cut-off mechanism C.

Specifically, my invention in its illustrated embodiment, comprises a generally rectangular case 10 having a bottom wall 11, side walls 12 and 13, an open front closed by the removable type unit of the printing mechanism P and the stapling unit S, a fixed upper back wall section 14, and a removable lower back wall section 15. The rear portion of the top of the case 10 is closed by a cover 16 of spring metal secured to the side walls 12, 13 and back wall section 14 by screws 17 which leave the forward portion of the cover free to form a spring 18 for co-action with the printing mechanism P in a manner to be later fully described.

Spanning and supported by the side walls 12, 13 is a horizontal partition or table 20 having a guideway 21 extending therethrough from one end to the other and having an entrance slot 22 in the back wall section 14 for the insertion of a strip of ticket stock T from a supply roll thereof (not shown) for feeding of the stock in a step by step movement through the open front of the case 10 by feeding mechanism F.

Figure 14:
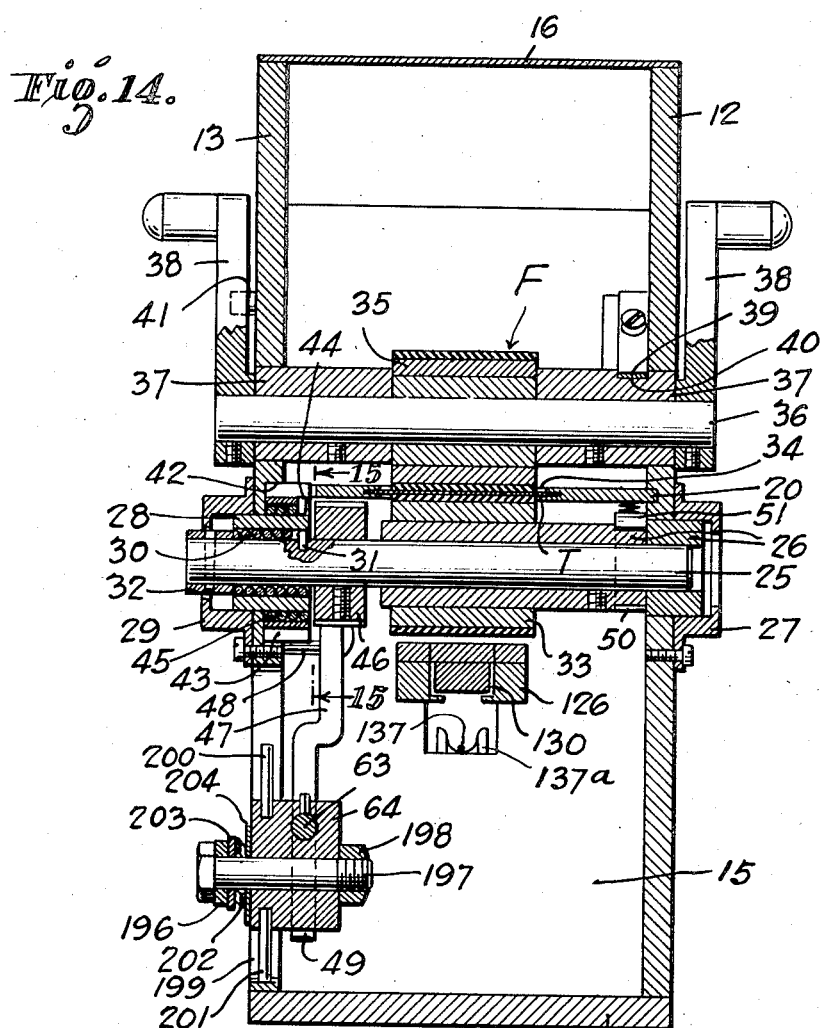
Figure 14 is a vertical transverse sectional view taken on the line 14—14 of Figure 12 and illustrating the stock feeding mechanism.

The feeding mechanism F shown in detail in Figure 14, comprises a feed shaft 25 to which is fixed a sleeve 26 the outer end of which is journaled in a bearing 27 secured to the side wall 12. A drive sleeve 28 is journaled in a bearing 29 secured to the side wall 13, and the drive sleeve freely receives the shaft 25 with an annular space therebetween sufficient to freely receive a helical clutch spring 30. One end of the clutch spring is fixed at 31 to the shaft 25, and its other end is free and is confined against axial displacement on the shaft by a retaining collar 32 fixed to the outer end of the shaft. The clutch spring 30 is normally expanded against the internal annular surface of the drive sleeve 28 and provides an overrunning clutch operatively connecting the sleeve 28 to the shaft 25 with sufficient friction therebetween to perform the required feeding of ticket stock through the guideway 21.

Fixed to the sleeve 26 is a feed roller 33 engaging the underside of the ticket stock T in the guideway 21 through a slot 34 in the table 20. Directly opposite the feed roller 33 above the table 20 is an idler pressure roller 35 rotatably mounted on a shaft 36 fixed eccentrically in journal sleeves 37 rotatably mounted in alined openings in the side walls 12 and 13. Hand cranks 38 are fixed to the outer ends of the shaft and enable the latter and hence the sleeves 37 to be rotated to move the pressure roller 35 into and out of engagement with the ticket stock through the table slot 34 according as the stock is to be fed by the mechanism F or be free for manipulation manually in the guideway 21. A spring 39 is adapted to bear upon a flattened portion 40 of one of the sleeves 37 to releasably retain the pressure roller 35 in operative engagement with the stock T, and a stop pin 41 (Figure 14) projects from the wall 13 for engagement by one of the cranks 38 in such operating position of the roller.

Figure 15:
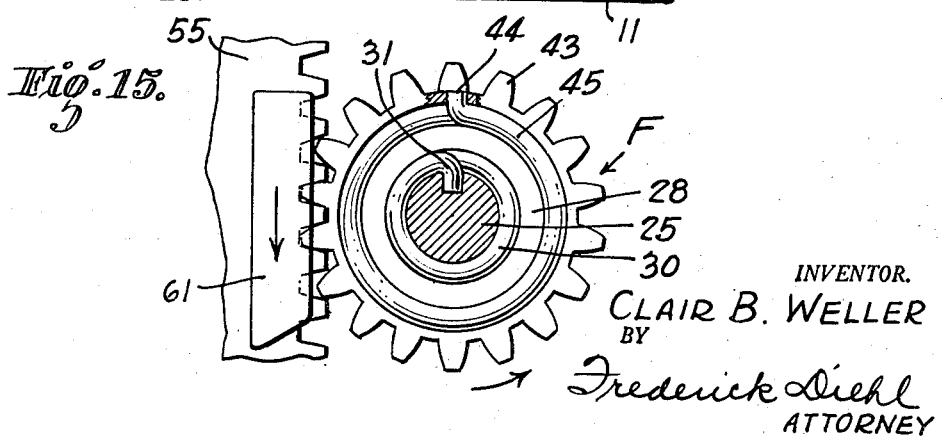
Figure 15 is an enlarged fragmentary detail sectional view illustrating driving and overrunning clutch devices embodied in the stock feeding mechanism.

Freely receiving the drive sleeve 28 and rotatably mounted in a recess 42 in the side wall 13 is a driving gear 43 to which is fixed at 44 one end of a helical drive spring 45, which, in response to driving of the gear 43 in the direction of the arrow in Figures 2 and 15, is caused to be constricted upon the drive sleeve 28 to correspondingly rotate the latter and hence the shaft 25 through the medium of the clutch spring 30.

Also fixed to the shaft 25 is a ratchet wheel 46 (Figure 12) adapted to be engaged by a locking member or pawl 47 to limit the amount of feeding movement imparted to the ticket stock, the pawl being pivotally mounted on a pin 48 projecting from the side wall 13 and having an arm 49 adapted to be actuated to move the pawl to locking position in a manner to be later fully described. A ratchet wheel 50 is formed on the sleeve 26 and is constantly engaged by a spring-pressed holding pawl 51 mounted on a pin 52 on the side wall 12 and operable to prevent retrograde movement of the shaft 25 and hence the feed roller 33.

Constantly meshing with the driving gear 43 is a rack bar 55 reciprocably mounted in a guide recess 56 in the wall 13 and having a depending extension 57 connected at 58 to an operating member 59, with a spring 60 connecting the latter to the case 10 to normally urge the rack bar to its extreme position shown in Figure 2. The operating member 59 may be actuated by a foot pedal, handle crank, or switch-controlled motor (none of which is shown).

Fixed to the rack bar 55 is a cam 61 which, following sufficient movement of the rack bar from its normal extreme position to feed a predetermined length of ticket stock (one and three-eighths inches in practice), engages the head 62 of a pin 63 reciprocably mounted in a carrier 64, to move the pin against the action of its spring 65 until the other end of the pin co-acts with the arm 49 of the locking pawl 47 in moving the latter to locking position in engagement with the ratchet wheel 46 to lock the shaft 25 and hence the feed roller 33 against further rotation as movement of the rack bar is continued for a purpose to be later described.

The printing mechanism P comprises a rectangular frame 70 with which is removably associated the type unit of the printing mechanism. The frame 70 is mounted for vertical movement by pairs of parallel links 71 and 72 pivotally mounted on fixed pins 73 and 74 projecting from the side walls 12 and 13 and pivotally connected at 75 and 76, respectively, to the frame. The pivotal connections 76 of the links 72 are in the form of large disks having sockets in the form of radial slots 77 adapted to receive the reduced outer ends of a tubular pin 78 on which is mounted a number of type wheels 79 (Figure 17) and an arcuate indicia-bearing and suitably graduated cover 80 which is clamped securely on the pin by nuts 81 screwed on the threaded portions 82 of the pin and bearing against the sides of the cover.

The sides of the cover are provided at diametrically opposed points with parallel recesses 83 and 84 adapted to receive the opposite members 85 and 86 of the frame F to dispose the axis of the pin 78 and those of the disks 76 in axial alinement. A headed rod 88 is adapted to be extended through the pin 78 and the disks 76 and to threadedly receive a knob 89 to rigidly secure the type unit in the frame with the cover 80 closing the upper front portion of the case, and the type wheels concealed by the cover. The cover is provided with circumferential slots 90, one for each type wheel 79 of which latter seven are shown in the present instance and are provided with actuating handles 91, by which they may be selectively and independently rotated to dispose any particular type character 92 in the lowermost position for printing therefrom. Springs 93 carried by the type wheels 79 are adapted to seat in notches 94 in the internal surface of the cover 80 to releasably retain the type wheels in the position of rotary adjustment to which they are moved by the handles 91 in accordance with the matter to be printed as indicated in the circumferential column 95 of indicia on the cover, co-incident with graduations 96 extending axially on the cover between the slots 90 thereof.

Projecting from the pair of links 72 are arms 100 having longitudinal slots 101 therein receiving the ends of a pivot pin 102 mounted in an ink fountain 103 mounted for reciprocating movement on the table 20 in guide members 104 secured to the table, to occupy the retracted position shown in Figure 2 or the advanced position for inking as shown in Figure 5 according as the printing mechanism is raised for inking or lowered for printing as shown in the respective figures. Mounted on the pin 102 is an arm 105 to which is fixed an inking pad 106. A flat spring 107 is fixed to the arm 105 and bears against the ink fountain 103 to urge the arm downwardly to a position in which the pad will be immersed in a supply of ink in the fountain.

Projecting from the arm 105 is an actuating lever 108 the free end of which is adapted to be engaged by a cross bar 109 rigidly connecting the outer ends of the links 72, for co-action with the cross bar in moving the inking pad 106 upwardly into contact with the type characters 92 of the type wheels 79 selected for printing, so as to ink the characters when the printing mechanism is raised, all as clearly shown in Figure 5.

Pivotally connected at 110 to the links 72 are links 111 having longitudinal slots 112 receiving the ends of a pin 113 fixed to the underside of a pressure platen 114 pivotally mounted on a pin 115 supported from the side walls 12, 13, and urged downwardly by a spring 116 to normally dispose the pressure pad 117 of the platen 114 clear of the underside of the ticket stock T in the guideway 21 and directly opposite the type characters 92 selected for printing.

Pivotally mounted at 118 on the upper end of the rack bar 55 is a connector 119 having a hook 120 normally urged by a spring 121 to engage a lug 122 on the cross bar 109 to move the printing mechanism P to its raised inking position for inking by the pad 106 as the rack bar is moved to feed the ticket stock T a predetermined distance in the guideway 21. The connector 119 is provided with a cam surface 123, which, immediately following the feeding of the stock, engages a fixed lug 124 on the side wall 13 so as to be moved by the lug against the spring 121 sufficiently for the hook 120 to disengage the cross bar 109. The spring cover 18, which bears upon the frame member 85 of the frame 70 and is loaded in response to raising of the printing mechanism for inking is now free to instantaneously move the printing mechanism downwardly to printing position and the platen 114 upwardly to momentarily press the ticket stock T into printing contact with the characters 92 selected for printing, all as clearly shown in Figure 6.

The stapling mechanism S comprises an L-shaped support or frame 125 to provide a long, horizontal plate 126 and a vertical plate 127 secured by screws 128 to the side walls 12, 13 to close the lower portion of the front of the case 10. The rear portion of the horizontal plate 126 projects from the rear of the case and is rigidly supported by the removable lower back wall section 15 of the case.

The horizontal plate 126 is provided with a longitudinal guideway 130 of U-shaped cross section to receive a clip of staples 131 which is insertable into the guideway through a slot 132 in the top of the plate 126. A pusher 133 is slidably mounted in the guideway 130 and is urged against the rear end of the clip of staples by a coil spring 134 trained about a grooved idler wheel 135 mounted in bearings 136 secured to the plate 126, one end of the spring being secured to the pusher, and the other end anchored to a bracket 136a depending from the plate 126.

One end of a cable 137 is secured to the pusher 133, and its other end is secured to a winding reel 137a fixed to a hollow shaft 138 journaled in bearings 139 depending from the plate 126 (Figures 3 and 4). A coil spring 140 disposed in a recess 141 in the reel 137a has one end secured to the latter and the other end secured to one of the bearings 139. The spring 140 tends to rotate the reel in a direction to exert a pull upon the cable 137 sufficient to maintain the latter taut. A hand crank 142 has a shaft 143 insertable into the shaft 138 to enable the reel 137 to be rotated to draw the pusher 133 rearwardly in the guideway 21 to a position wherein the pusher is to the rear of the slot 132 for the insertion of a clip of staples through the slot into the guideway.

The pusher 133 urges the leading staple 131 of a clip thereof into the guideway 145 of a presser member 146 reciprocally mounted in a recess 147 in the vertical plate 127. Coil springs 148 are mounted on rods 149 fixed in cross pieces 150 on the plate 127, and abut the cross pieces and a cross bar 151 fixed to the presser member, all so as to urge the latter to the retracted position shown in Figures 5 and 8 where the upper end of the presser member which is constructed to provide a staple transfer channel 152, stops against the plate 126.

The leading staple 131 of the clip is disposed in the guideway 145 immediately in advance of a ram 153 reciprocally mounted in such guideway and normally urged to the retracted position shown in Figures 5 and 8 by coil springs 154 mounted on rods 155 also fixed to the cross pieces 150 and abutting the latter and a cross bar 156 fixed to the ram and having its reduced ends slidably mounted in guides 157 fixed to the plate 127, all as shown in these figures. Compensating coil springs 158 are mounted on the rods 149 between the cross bars 151 and 156 to provide a yieldable operative connection between the presser member 146 and the ram 153 as will be later fully described.

A cover plate 159 is secured to the plate 127 and is provided with a discharge chute 160 for unused staples, and with an article rest 161 having a slot 162 through which the presser member 146 and the ram 153 are adapted to pass for co-action of the presser member with the ticket stock and the ram with an anvil 163 transversely spanning the table 20 above the ticket stock and provided with staple-bending grooves 164.

An actuating lever 165 for the ram 153 is pivotally mounted intermediate its ends on a pin 166 supported in bearings 167 depending from the plate 126, for engagement of one end of the lever with the cross bar 156 in response to engagement of one end of a pin 168 on the other end of the lever by the shoulder 169 of a connector 170. The connector 170 is pivotally mounted at 171 on the rack bar 55 and is urged in one direction by a spring 172 to maintain the lever in engagement with the pin 168 during movement of the rack bar.

The cut-off mechanism C comprises a fixed blade 175 and a movable cutting blade 176, the fixed blade spanning the table 20 transversely and having a slot through which passes the ticket stock T.

The blade 176 is pivotally mounted at 177 (Figure 11) and is yieldingly urged by a flat spring 178 against the face of the fixed blade 175. A spring 179 secured at one end to a bracket 180 is connected at its other end to the blade 176 to normally urge the latter to the non-cutting position shown in Figures 2 and 11.

Connected at 181 to the blade 176 is one end of a rod 182 the other end of which passes freely through an opening in an ear 183 projecting from one end of an actuating lever 184 and having nuts 185 to maintain the rod operatively connected to the ear. A coil spring 186 is mounted on the rod between a collar 187 fixed to the latter, and a thrust washer 188 bearing against the ear, all to provide a yieldable operative connection between the lever 184 and the blade 176 for a purpose to be later described.

The lever 184 is pivotally mounted intermediate its ends on a pin 189 supported in a bifurcated bearing 190 on the bottom wall 11 of the case 10, and has a lug 191 disposed in the path of movement of the other end of the pin 168 carried by the actuating lever 165 for the stapling mechanism, all to the end of effecting concurrent actuation of the stapling and cut-off mechanisms as will be later fully described.

Fixed to a pin 192 on the side wall 13 of the case 10 is a stock feed control member 193 in the form of a hand lever having circumferentially spaced pins 194 and 195 between which is interposed an arm 196 freely mounted on the pin 192.

The free end of the arm 196 is bifurcated to receive a bolt 197 passing through the carrier 64 and provided with a nut 198. The carrier 64 is slidably mounted for adjustment in a slot 199 in the side wall 13, parallel to the guide recess 56 of the rack bar 55. Stops pins 200 and 201 on the carrier co-act with the respective ends of the slot 199 in definitely limiting the two extreme positions of adjustment of the carrier by the arm 196 when moved in one direction or the other by the respective pins 194 and 195 on the control member 193. A spring washer 202 on the bolt 197 co-acts with plain washers 203 and 204 to frictionally retain the carrier 64 in the position to which it is adjusted in the operation of the invention. Also fixed to the pin 192 at the inner side of the side wall 13 is an arm 205 adapted to engage and move the connector 170 out of operative relation to the pin 168 of the actuating lever 153, through the medium of a connecting pin 206 slidably mounted in a support 207 on the bottom wall 11 of the case 10.

The buttonhole forming unit B is shown in Figure 18 and is adapted to be substituted for the stapling mechanism S upon removal of the latter from the case 10. This unit B comprises a vertical plate 127a having a vertical guideway 210 in which is reciprocally mounted a buttonhole-forming punch 211 co-actable with a die 212 which is substituted for the anvil 163. A bracket 213 projecting from the plate 127a has mounted thereon by a pin 214 an actuating lever 215 operatively connected to the punch 211 by a pin-and-slot connection 216, and urged in one direction by a spring 217 to normally dispose the punch 211 in the retracted position shown. The actuating lever 215 has a pin 168a which is adapted to co-act with the connector 170 in the same manner as the latter co-acts with the pin 168 of the actuating lever 165 of the stapling mechanism, all in the operation of the invention which is as follows:

With the working parts of the invention occupying their normal positions shown in Figure 2, initial movement of the rack bar 55 by the operating member 59 will drive the feed roller 33 through the drive spring 44, drive sleeve 28, clutch spring 30 and shaft 25 to feed the ticket stock T in the guideway 21 of the table 20 to the left or the front of the case 10. Concurrently with this stock feeding operation, the hook 120 of the connector 119 engages the cross bar 109 of the links 72 to raise the printing mechanism P to its inking position shown in Figure 5 and to advance the ink fountain sufficiently for the inking pad 106 as raised by the movement of the lever 108 by the cross bar 109, to ink the lowermost row of characters 92 of the type wheels 79 selected for printing.

As the movement of the rack bar 55 progresses, the cam 61 thereon engages the head 62 and moves the pin 63 to cause the latter to actuate the locking pawl 47 by moving the pawl into locking engagement with the ratchet wheel 46, thus locking the shaft 25 and hence the feed roller 33 against further feeding movement so as to feed a definite amount of ticket stock (one and three-eighths inches in practice).

Immediately following the stock feeding operation, the lug 124 co-acts with the cam surface 123 of the connector 119 to move the hook 120 of the latter out of engagement with the cross bar 109 so as to free the printing mechanism for instantaneous lowering movement under the energy stored in the spring portion 18 of the cover 16, thus causing a momentary pressure to be imposed upon the ticket stock between the previously inked type characters and the pad 117 of the pressure platen 114 so as to print an impression of the characters upon the stock. It will be understood that the inertia of the printing mechanism resulting from the sudden release of the cross bar 109 from the connector 120 actually forces the type unit and pressure platen towards each other slightly beyond their normal position clear of the ticket stock as shown in Figure 2, so as to obtain the printing impression as indicated by the instantaneous printing position shown in Figure 6.

It is also to be noted that the clutch spring 30 permits the movement of the rack bar 55 to be continued beyond that position in which the pawl 47 is moved into locking engagement with the ratchet wheel 46 to stop feeding of the ticket stock as the power applied to the driving sleeve 28 through the gear 43 overcomes the friction between the driving sleeve and clutch spring so that the sleeve merely slips around the spring.

As movement of the rack bar 55 progresses, the shoulder 169 of the connector 170 engages the pin 168 and moves the actuating lever 165 to first advance the ram 153 to separate the leading staple 131 from the clip thereof in the guideway 130 and force the separated staple through the guideway 145 of the presser member 146 until the staple enters the guide channel 152 in the upper end of the presser member and is thus confined in the channel against tilting from a perpendicular position relative to the plane of the ticket stock, all as shown in Figures 8 and 9.

When the staple has been advanced into the channel 152, the compensating springs 158 engage the cross bar 151 and initiate movement of the presser member against its return springs 148 so that the ram and presser member travel as a unit until an article A applied to the rest 161 underneath the forward end of the ticket stock which has been printed upon, is forced tightly against the anvil 163, to thus stop further advancing movement of the presser member. However, by virtue of the compensating springs 158, movement of the ram 153 continues so that the staple in the channel 152 will be forced therefrom through the article and the ticket stock and will be clinched in the grooves 164 of the anvil, whereby to securely attach the ticket stock to the garment, all as shown in Figures 7 and 10.

As the stapling operation is being completed, the pin 168 strikes the lug 191 of the actuating lever 184 and moves the latter to effect cutting-off of a ticket from the stock by the blade 176 in shearing across the blade 175 as also shown in Figure 7. In order to compensate for different thicknesses of material to which a ticket is to be stapled, the spring 186 yields following the actual cutting through of the stock by the blade 176 so that further movement can be imparted to the ram 153 if necessary to complete the stapling operation. The ticket as now printed and attached to the article is illustrated in Figure 19.

Figure 13:
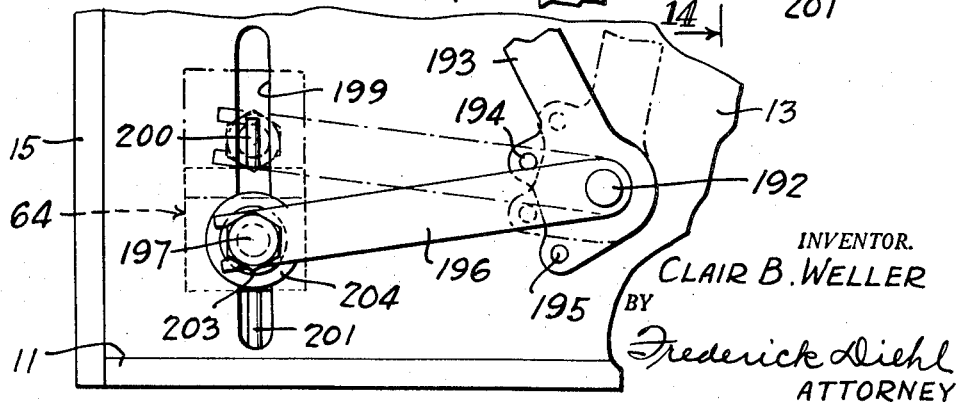
Figure 13 is a fragmentary view in side elevation illustrating the operating member of the listing mechanism.

Should it be desired to print two or more marks in a column on a single ticket as shown in Figure 20, the feed control member 193 is moved from its one extreme position shown in full lines in Figure 13 to its other extreme position shown in broken lines in this figure, thus adjusting the support 64 to a position in which the cam 61 will co-act with the head 62 in causing the pin 63 to move the pawl 47 to locking position when the ticket stcok has been fed only a relatively short distance (one-half inch in practice) sufficient to space one mark from the next.

This movement of the control member 193 also causes the arm 205 to move the pin 206 which latter shifts the connector 170 about its pivot 171 and against its spring 172 sufficiently for the shoulder 169 of the connector to clear the pin 168, thus temporarily disconnecting the stapling and cut-off mechanisms so that only the printing operation will be effected. Each time the machine is actuated with the reduced feeding of the ticket stock, a different mark determined by the resetting of the type wheels will be printed upon the ticket stock as shown in Figure 20.

When the desired number of marks have been printed, the control member 193 is moved to an intermediate position in which the support 64 is left in its position for the aforesaid reduced feed of the stock (one-half inch) but the arm 205 is moved sufficiently for the connector 170 to return to its normal position and thus operate the stapling and cut-off mechanisms to provide the ticket without unnecessary waste of ticket stock which would otherwise occur should the support 64 have been returned to its original position of adjustment following the printing of the several desired marks on the ticket stock.

It will be clear that with the buttonhole-forming unit B substituted for the stapling unit S, the ticket stock will be fed, the selected type characters inked, and the stock printed upon as previously described, and that the pin 168a will be engaged by the shoulder 169 of the connector 170 to actuate the lever 215 and cause the punch 211 and die 212 to co-act in punching the buttonhole H in the ticket for subsequent buttoning to a garment.

I claim:

1. In a machine of the class described, ticket stock feeding mechanism; printing mechanism; stock cut-off mechanism for forming a ticket therefrom; means for actuating said mechanisms to feed a predetermined length of stock, print upon the stock, and cut off a printed ticket from the stock; said actuating means including a reciprocable member movable from one extreme position to another during which feeding of the stock is effected; a locking ratchet for the stock feeding mechanim; a locking pawl co-actable with said ratchet; a cam carried by said reciprocable member; a pin providing an operative connection between said cam and pawl by which actuation of the latter to lock the stock feeding mechanim against feeding movement will be effected when the reciprocable member has been moved from said one extreme position to feed a predetermined length of stock; an adjustable support mounting said pin for adjustment to a position wherein the pin will be actuated by said cam when the reciprocable member has been moved to feed less than said predetermined length of stock; a pivotally mounted arm operatively connected to said support for adjustment of the latter; and a control lever having a lost motion operative connection with said arm.

2. In a machine of the class described, ticket stock feeding mechanism; printing mechanism; stock cut-off mechanism for forming a ticket therefrom; means for actuating said mechanisms to feed a predetermined length of stock, print upon the stock, and cut off a printed ticket from the stock; said actuating means including a reciprocable member movable from one extreme position to another during which feeding of the stock is effected; a locking ratchet for the stock feeding mechanism; a locking pawl co-actable with said ratchet; a cam carried by said reciprocable member; a pin providing an operative connection between said cam and pawl by which actuation of the latter to lock the stock feeding mechanism against feeding movement will be effected when the reciprocable member has been moved from said one extreme position to feed a predetermined length of stock; an adjustable support mounting said pin for adjustment to a position wherein the pin will be actuated by said cam when the reciprocable member has been moved to feed less than said predetermined length of stock; a pivotally mounted arm operatively connected to said support for adjustment of the latter; a control lever having a lost motion operative connection with said arm; a connector movably mounted on said reciprocable member for operation of the cutting-off mechanism during movement of the reciprocable member; and means operable in response to adjustment of said support as aforesaid, to move the connector to a position wherein it will be incapable of actuating the cut-off mechanism.

3. In a machine of the class described, stock feeding mechanism; printing mechanism including a type unit having a frame; rotatably adjustable type wheels mounted in the frame about a common axis; means mounting the frame for movement to occupy an inking position and a printing position; means urging the frame to printing position; means for actuating said mechanisms to feed a predetermined length of stock and print from said type wheels on the stock; said actuating means including a reciprocable member movable from one extreme position to another during which feeding of the stock is effected; a connector mounted on said reciprocable member and urged to operatively connect the latter to said frame for movement of the latter to inking position as movement of the reciprocable member from said one extreme position is effected; and means for actuating said connector to disconnect same from said frame when the reciprocable member has moved a predetermined amount from said one extreme position, so as to free the frame for movement to printing position and printing of the stock by said type wheels.

4. In a machine of the class described, stock feeding mechanism; printing mechanism including a type unit having a frame; rotatably adjustable type wheels mounted in the frame about a common axis; means mounting the frame for movement to occupy an inking position and a printing position; means urging the frame to printing position; means for actuating said mechanisms to feed a predetermined length of stock and print from said type wheels on the stock; said actuating means including a reciprocable member movable from one extreme position to another during which feeding of the stock is effected; a connector mounted on said reciprocable member and urged to operatively connect the latter to said frame for movement of the latter to inking position as movement of the reciprocable member from said one extreme position is effected; means for actuating said connector to disconnect same from said frame when the reciprocable member has moved a predetermined amount from said one extreme position, so as to free the frame for movement to printing position and printing of the stock by said type wheels; a movably mounted pressure platen; and means operatively connecting said platen to said frame for movement of the platen to pressure-applying position when the frame moves to printing position.

5. In a machine of the class described, stock feeding mechanism; printing mechanism including a type unit having a frame; rotatably adjustable type wheels mounted in the frame about a common axis; links mounting said frame for movement to occupy an inking position and a printing position; means urging the frame to printing position; means for actuating said mechanisms to feed a predetermined length of stock and print from said type wheels on the stock; said actuating means including a reciprocable member movable from one extreme position to another during which feeding of the stock is effected; a connector having a hook and being pivotally mounted on said reciprocable member; a spring urging said connector in a direction for its hook to engage one of said links for movement of the frame to inking position as movement of the reciprocable member is effected; and a fixed lug engageable with said connector to disengage same from said frame when the reciprocable member has moved a predetermined amount from said one extreme position.

6. In a machine of the class described, ticket stock feeding mechanism; printing mechanism; stock cut-off mechanism for forming a ticket therefrom; means for actuating said mechanisms to feed a predetermined length of stock, print upon the stock, and cut off a printed ticket from the stock; means for controlling the stock feeding mechanism to reduce the length of stock fed upon each actuation of the last means, so as to enable a plurality of relatively closely spaced characters to be printed on the stock upon successive actuations of the last means; and means operatively associated with said feed control means to disconnect the cut-off mechanism from the actuating means when the reduced feeding of stock is in effect; said stock feeding mechanism including a feed roller; a rotatably mounted shaft to which said feed roller is fixed; a drive sleeve freely receiving said shaft; a helical clutch spring expanded against the internal surface of said sleeve and fixed at one end to the shaft to provide a frictional driving connection by which rotation of the sleeve will correspondingly rotate the shaft; a rotatably mounted driving element freely receiving said sleeve; and a helical drive spring having one end fixed to said driving element and being constricted about said sleeve to rotate the latter in one direction on rotation of the driving element by the aforesaid actuating means for said mechanisms.

CLAIR B. WELLER.

REFERENCES CITED

The following references are of record in the file of this patent:

UNITED STATES PATENTS

| Number | Name | Date |
|---|---|---|
| 846,945 | Pierce | Mar. 12, 1907 |
| 960,206 | Silverstein | May 31, 1910 |
| 1,028,225 | Kohnle | June 4, 1912 |
| 1,048,136 | Davis | Dec. 24, 1912 |
| 1,111,020 | Hoefer | Sept. 22, 1914 |
| 1,169,339 | Maynard | Jan. 25, 1916 |
| 1,398,733 | McFillen | Nov. 29, 1921 |
| 1,685,504 | Scheuer | Sept. 25, 1928 |
| 1,851,753 | Crane | Mar. 29, 1932 |
| 2,125,731 | Lipps | Aug. 2, 1938 |
| 2,202,259 | MacDonald | May 28, 1940 |
| 2,205,724 | Hines | June 25, 1940 |
| 2,427,602 | Helsel | Sept. 16, 1947 |